United States Patent [19]

Suska

[11] 3,921,225
[45] Nov. 25, 1975

[54] LONG LIFE HINGE
[75] Inventor: Charles R. Suska, Roxbury, Conn.
[73] Assignee: The Stanley Works, New Britain, Conn.
[22] Filed: Oct. 31, 1974
[21] Appl. No.: 519,772

Related U.S. Application Data
[63] Continuation-in-part of Ser. No. 279,175, Aug. 9, 1972, abandoned.

[30] Foreign Application Priority Data
Aug. 7, 1973    Canada.................................. 178211

[52] U.S. Cl. .................................................. 16/136
[51] Int. Cl.² .......................................... E05D 11/04
[58] Field of Search.......... 16/136, 128 R, 135, 174; 126/194; 308/135, 70, 238; D10/9

[56] References Cited
UNITED STATES PATENTS
3,499,183    3/1970    Parsons................................ 16/136
3,725,973    4/1973    Gwozdz.............................. 16/136

Primary Examiner—Geo. V. Larkin
Attorney, Agent, or Firm—Brumbaugh, Graves, Donohue & Raymond

[57] ABSTRACT

A low friction, long life concealed bearing hinge has plastic bushings inserted in the abutting ends of adjacent hinge knuckles. A hinge pin through the bushings results in a radial bearing surface between the hinge pin and the hinge bushing. The smooth outside faces on adjacent axially abutting bushings provide a thrust bearing between adjacent knuckles. The plastic materials are selected to interact mutually and with the hinge pin in a favorable way to retard wear.

44 Claims, 2 Drawing Figures

LONG LIFE HINGE

BACKGROUND OF THE INVENTION

This is a continuation-in-part of application Ser. No. 279,175 filed Aug. 9, 1972 and now abandoned.

This invention relates to an improvement in hinges, and more particularly to an improvement in architectural grade concealed bearing hinges suitable for high frequency service or for heavy doors.

A recent development in the field of architectural grade hinges has been the use of a plastic bushing inserted into a hinge knuckle in facing relationship with a cooperating metal bushing inserted in the adjacent knuckle to provide a bearing between the hinge pin and the knuckle and a concealed thrust bearing between adjacent knuckles as taught in U.S. Pat. No. 3,499,183 to Parsons. The improved performance of these new hinges is attributable, firstly to the low coefficient of friction between the plastic bushing there described and the metal parts which obviates the need for external lubrication such as grease or oil lubricants required by prior art hinges. These external lubricants should be distinguished from "internal lubricants" which are within the material and provide lubricant as the material wears away.

External lubricants required by prior art hinges have been a cause of many problems: they are susceptible to contamination by corrosive chemicals or abrasive grit; they are subject to degradation by oxidation and evaporation of the more volatile constituents; and, they can be washed out of the hinge by cleaning solutions applied to the building. Consequently, hinges needing no external lubrication, and therefore immune to these lubrication related problems, are less vulnerable to the accelerated wear caused by failure of the lubricant.

Secondly, the plastic of the bearing bushing is virtually chemically inert to those substances normally encountered by hinges, hence there is no need to provide it with the protective coatings and other steps needed by prior art metal bushings to protect them from corrosion by their intended environments. Since the plastic bushing never becomes corroded and never develops appreciable friction with the hinge pin, operation throughout the longer life of the hinge is generally smoother and quieter than that of metal hinges.

Finally, plastic bearing bushings are easily fabricated with very precise tolerances at low cost and high volume production. For this reason alone, irrespective of their functional advantages, plastic bushings have offered an economic incentive to their acceptance by the art.

As anticipated, these new hinges disclosed in the aforementioned Parsons patent have been accepted by the trade as a welcomed solution to a long standing problem. This ready acceptance and wide use, however, have brought to light several problems whose solution would greatly improve an already excellent hinge. Although the wear resistant characteristics of plastic-to-metal interfaces are superior to metal-to-metal interfaces in this application, yet even plastic-to-metal interfaces are subject to a degree of wear which would be desirable to eliminate. But more importantly, if an imperfection, such as a burr or a nick, occurs in the cooperating metal bearing surface, the resulting gouging and scoring of the facing plastic surface will be extensive and permanent to the detriment of the bearing surface which may result in an earlier need to replace the entire hinge.

A related problem is incurred when the door, and a heavy door in particular, is being hung. It is difficult to maneuver a heavy door to intermesh the hinge knuckles exactly without scraping the concealed bearing surface. When the scraped bearing surface is metal and the scraping edge is metal, the burrs resulting on the metal bearing surface can result in serious damage to the plastic bearing surface.

Another problem is the difficulty of manufacturing to attain exact parallelism between bearing thrust surfaces, that is, exact perpendicularity of thurst surfaces with the pin for all positions of the leaves. When a metal bushing is not exactly perpendicular to the pin, the pressure between the plastic and metal bearings will be greatest at the high point of the metal bushing, resulting in accelerated wear of only one bushing, the plastic bushing, at the locus of contact positions between the high point and the facing plastic bearing surfaces. The result is a beveled plastic bearing surface. In addition, the wear products may migrate between the plastic bushing bore and the pin and cause wear in the bushing bore. The resulting enlarged bushing bore and the beveled bearing surface will cause looseness or play in the hinge and permit the load pivotally supported by the hinge to sag.

Thus, the need exists in the art for a long life hinge having fully supported practically frictionless concealed bearing bushings sealed against the entrance of abrasive dirt and protected from damage. The hinges should have longer wearing and lower friction thrust bearings than hinges heretofore known in the art.

SUMMARY OF THE INVENTION

Accordingly, this invention provides a new and improved low friction, heavy duty hinge having concealed plastic thrust-bearing faces protected from damage by adjacent edges and facing surfaces to yield improved thrust bearing characteristics combined with an improved aesthetic appearance and an improved efficacy for excluding abrasive dirt and grit from the bearing interfaces.

The inventive hinge combines lower manufacturing costs with the improved performance features of self-lubrication and a long operating life of tight, quiet, low friction pivotal support of heavy loads.

These and other objects of the present invention are attained by providing a hinge with at least one hinge knuckle on each leaf and a plastic bushing inserted in the adjacent ends of adjacent knuckles. When the hinge halves are fitted together so that the knuckles are axially aligned, the surfaces which bear the thrust exerted by the weight of the load are the axially facing surfaces of the plastic bushings. Since the bushings are recessed within the hinge knuckles, protruding beyond their ends only very slightly, they receive full radial support from the knuckles and allow the space between adjacent knuckles to be made very narrow, thus substantially concealing the bearings from view and excluding grit and other abrasive foreign matter while presenting a trim and pleasing appearance.

The plastic materials for the mating bushing pairs are selected to mutually interact at their thrust bearing surfaces and to interact with the hinge pin at their radial bearing surfaces to retard the process of wear on the bearing bushing surfaces.

DESCRIPTION OF THE DRAWINGS

A more complete appreciation of the invention and its many attendant advantages will develop as the same becomes better understood by reference to the following detailed description when considered in connection with the accompanying drawings, in which.

DESCRIPTION OF THE PREFERRED EMBODIMENT

Figure 1:
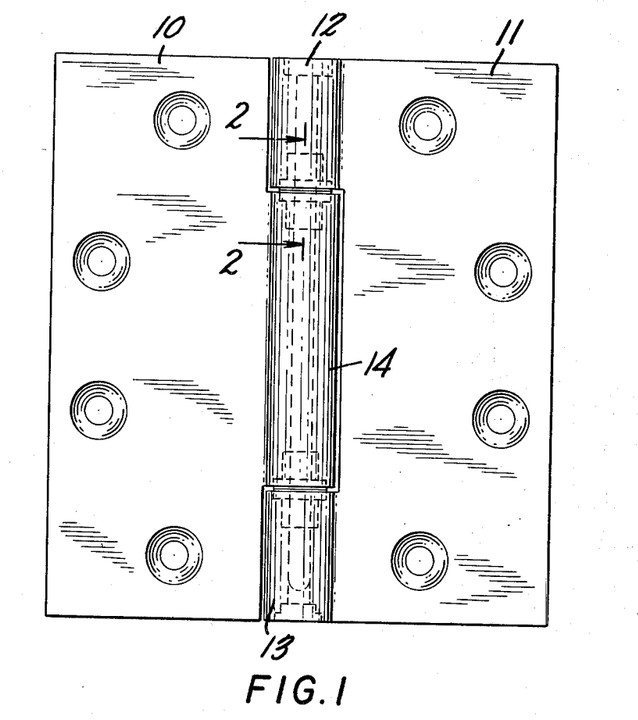
FIG. 1 is an elevation of a hinge constructed according to the present invention.

Referring now to the drawings, wherein like reference characters designate identical or corresponding parts, and more particularly to FIG. 1 thereof, a full mortise hinge is shown having a pair of juxtaposed hinge leaves 10 and 11. Along the respective adjacent, parallel edges of the leaves are respectively attached a pair of outside hinge knuckles 12 and 13 and a central hinge knuckle 14. Each hinge knuckle is a cylindrical metal sleeve attached to the edge of its leaf such that the knuckle axis is parallel to the leaf edge and lies in or slightly above the plane of the front or outside face of the leaf. Note that the spacing of the knuckles shown in the drawings has been exaggerated to show the hinge construction with greater clarity. In a typical commercial embodiment of the inventive hinge, the knuckles are very closely spaced as discussed in greater detail below.

Figure 2:
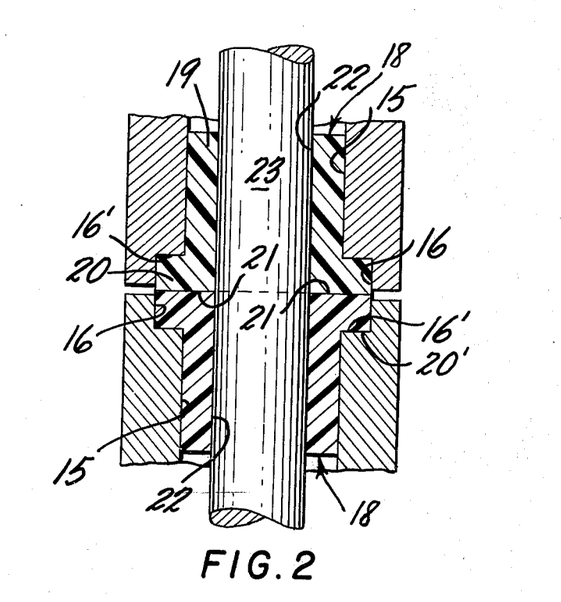
FIG. 2 is a partial sectional view of adjacent ends of two adjacent hinge knuckles along line 2—2 in FIG. 1.

Looking now at FIG. 2, an axial bore 15 extends through each knuckle and is widened or counterbored at the interior knuckle ends to form an annular recess 16 having an axially facing, radially extending surface 16'.

A plastic bushing 18 is provided for each interior end of each knuckle. The bushing includes a cylindrical shank portion 19 and a flange 20 formed at one end thereof constituting a shoulder having an axially facing, radially extending surface 20'. The external diameter of shank 19 closely matches the internal diameter of axial bore 15 through the knuckles, and the external configuration of flange 20 closely matches the internal dimensions of recess 16.

The thrust exerted by the load, such as a heavy door, is borne by the concealed abutting end faces 21 of flanges 20. The thrust is transmitted between the knuckles and the flanges of abutment of axially facing surfaces 16' and 20' of recess 16 and flange 20.

Preferably the axial depth of each flange slightly exceeds the axial depth of its recess so that the flange protrudes axially slightly beyond the recess as shown in FIG. 2, greatly exaggerated for clarity. The protruding end or ends of one or both flanges 20 maintain a narrow gap, for example, 0.030 inch or 0.76 mm between the ends of adjacent knuckles, thereby precluding frictional contact therebetween, but providing a bearing concealed from view.

An axial bore 22 is formed through each bushing so that when the knuckles are aligned, the axial bores through the bushings are also aligned. A cylindrical hinge pin 23 extends through the bushing bores and secures the hinge knuckles in rigid axial alignment.

The hinge illustrated has three hinge knuckles thereon: leaf 11 having a central knuckle 14 and leaf 10 having two end knuckles 12 and 13 which bracket the central knuckle when the hinge is assembled. Other configurations are contemplated, however, such as a hinge having a single knuckle on each leaf, which would be particularly useful when the load that is pivotally supported by the hinge is to be removed from the hinge frequently. In this instance the hinge pin could be fastened in one knuckle and extend into the bore in the other knuckle. A recess provided around the pin in the one knuckle would receive one of the plastic bushings and the bore in the other knuckle would receive the other bushing. Other configurations including hinges having more than three knuckles are obviously suitable for improvement by this invention and are intended to be covered by the appended claims.

The recess into which the bushing flange fits fulfills a plurality of functions. It provides radial support for the bushing flange when the bushing is subjected to compressive radial loading by the pin and it provides thrust support for the bushing flange when it is subjected to compressive thrust loading by the adjacent knuckle bushing. The tendency for the flange to radially "creep" of flatten under pressure and for axial play to develop in the hinge as a result, and for radial play to develop as a result of widening of the bore is effectively eliminated by providing the flange with radial support against flattening, and by channeling whatever creep may occur in the bearing bushing radially and axially toward the interior of the knuckle so that the bushing becomes more snug in its bore and fits more closely to the hinge pin as the load is increased.

The tight fit of the bushing in the bore results in tight and quiet operation, and also a very secure sealing of the internal working parts of the hinge from the entrance of abrasive grit or dirt. The shorter life of prior art bearing bushing hinges is partly attributable to the entrance of abrasive grit into the moving parts of the hinge.

The clean, trim and handsome appearance of the hinge is achieved by obviating the need to externally lubricate the bearings periodically and by recessing the bushings within the knuckles to virtually eliminate the gap between the knuckles and to conceal the bearings from view. By eliminating the need for periodic external lubrication, the hinge is kept dry, i.e., free of oil and grease, at all times and hence there is no tendency for dirt to collect in the gap. Thus, the same structural features that present so pleasing an aesthetic appearance also provide the important utilitarian function of maintaining the internal bearing surfaces clean. As discussed below, inadvertent oiling of the hinges will not significantly change the wear characteristics of the bearings. Moreover, in certain instances it may be desirable, although not necessary, to provide a thin film of break-in oil on the thrust bearings.

In certain hinges, the bushings 19 may be formed without flanges 20 by increasing the diameter of the shank portion 19 and elongating the annular recess 16. In such hinges the interior axial end of the bushing performs the function of the surface 20' and the floor of the recess provides the compressive thrust support for the bushing.

A number of combinations of plastics for the concealed bearing bushings have been found to provide superior wear-resistant and low friction characteristics. Among the best materials found for the bushing in the knuckle that rotates relative to the pin, as well as rotating relative to the other bushing, was an acetal resin, preferably having a uniform dispersion of discrete particles (such as filaments, fibers, flakes or grains) of a low friction material that has the property of transferring in a self-renewing film to a surface against which it rubs such as polytetrafluoroethylene (TFE). One such material is Delrin AF (DAF), an acetal resin made by duPont with approximateley 20 percent TFE by weight in the form of fine filaments or fibers dispersed uniformly throughout the acetal. Small amounts of carbon black, for example, about 0.05 percent by weight, may be added to this material for color. For color purposes, Delrin 507 (D507), an acetal resin sold by duPont with carbon black added for color, was mixed with DAF in a 1 to 10 ratio (9.1 percent D507 by weight) for use in this knuckle.

Another example is an acetal resin having a TFE powder dispersed in it and sold by LNP (Liquid Nitrogen Products of Malvern, Pa.) under the trademark Fulton 404. Fluorinated ethylene propylene (FEP) is also a low friction material that may be used. The TFE or FEP in the bushing against which the pin moves transfers to the pin in a self-renewing film of lubricant which produces less wear products to work into the thrust bearing than the same material without the TFE or FEP additive. Good performance has also been obtained with the use of thermosetting phenolic resins, for example Textolite 2001, a laminated product consisting of phenolic resin reinforced by a fine weave cotton base and having a graphite content of about 2.5 percent by weight. Cellulose acetate butyrate (CAB) and an aromatic polycarbonate resin derived primarily from bisphenol A such as Lexan made by General Electric Company have worked well in the bushing that rotates relative to the pin. A polycarbonate resin with dispersed discrete particles of low friction materiala such as DL-40-40, a polycarbonate with a dispersion of 20 percent TFE by weight sold by Liquid Nitrogen Products has also been found useful.

For the bushing in the mating knuckle, which rotates relative to the other bushing but with respect to which the pin is stationary, several plastics were found to yield excellent results. These include polycarbonate resin (Lexan) and an acetal resin sold by duPont under the trademark Delrin 500 (D500) and Delrin 507 (D507), the latter of which is Delrin 500 with the addition of a very small percentage of carbon black for color. Acetal and polycarbonate resins may both be used in this bushing with a dispersion of discrete particles of low friction material available as DAF and DL-40-40, respectively. Lexan fortified with 40 percent by weight of glass fibers was also used. Also included are various forms of phenolic thermoset plastics including laminates such as Textolite 1841A (a laminated material consisting of a phenolic incorporating a fine weave cotton cloth base), Textolite 2001 and Textolite 2008, a laminated product formed of a phenolic reinforced with a paper base. Lexan and Textolite are trademarks identifying products made by General Electric Company. A high density polyethylene resin sold under the trademark Hercules 1900 by Hercules Incorporated, Wilmington, Del., has also been found to work well in this knuckle.

The low friction TFE, dispersed throughout the bushing materials used in either of the knuckles, is preferably on the order of about 20 percent by weight. This percentage provides excellent internal lubrication and low friction characteristics and yet does not unduly weaken the material with which it is combined. However, greater or lesser percentages of the low friction material may be used. For example, bushings formed of 5 to 27 percent TFE by weight dispersed in Delrin showed improved properties with respect to Delrin alone. Specifically, the wear characteristics of the bushings improved markedly as the percentage was increased from 5 to 20 percent TFE by weight. Additional percentages of TFE showed little improvement over the 20 percent TFE bushings.

The bushings are essentially formed of the plastic materials discussed above. This language contemplates the addition of reinforcing substances such as glass fibers, cloth or paper which do not adversely affect the hinge bearing properties of the plastics, or the addition of other materials in the plastics which in the amounts used do not adversely affect the hinge bearing properties of the plastics.

The invention has been practiced in a number of embodiments embraced within the scope of the appended claims. Examples of the claimed combinations of bushing materials are presented in the chart below. In each of these examples, the bushings were installed in a full mortise hinge having a two knuckle leaf (2KL) and a mating one knuckle leaf (1KL) as illustrated in the drawings. The bushings in the one knuckle leaf rotate relative to the hinge pin when the hinge is operated and are stationary with respect to the two knuckle leaf. The conditions under which the hinges were operated in each example were more severe than the performance test specifications set forth in the American National Standards Institute publication ANSI AL56.1-1970. Specifically, in each of the tests conducted, a full mortise hinge 4.5 inches long and 4.5 inches wide was arranged to support a 75 pound load on each test hinge. Note that this is a severer test than required by the ANSI standards which permit three hinges per 150 pound door with the hinges sharing the load. The ANSI standards require, for Grade 2 hinges, 1,500,000 cycles of operation with a maximum vertical wear of 0.030 inch and a maximum lateral wear of 0.062 inch.

The vertical wear (V) is the combined wear at the thrust bearing interface. The lateral wear (L) represents the wear in the bushing bore and is a measure of how far the door leaf of the hinge can shift or tilt in the radial direction away from the hinge pin towards the load supported by the hinge. A "cycle" is one 90° swing of the hinge in one direction, and one 90° swing in the other direction back to the beginning position. Using the inventive hinges with plastic bushings, the vertical wear in these examples did not exceed 0.030 inch, the maximum vertical wear, or 0.062 inch, the maximum lateral wear permitted under the ANSI specifications at 1,500,000 cycles. Note Example 1 in which 0.005 inch vertical wear and 0.017 inch lateral wear occurred at 75,900,000 cycles of operation, a result far exceeding the ANSI standards.

ASsuming a knuckle spacing of 0.030 inch, as discussed heretofore, at about 0.030 inch of vertical wear the adjacent ends of adjacent hinge knuckles come into contact and begin producing metal wear fragments. These metal wear products may work into the bearing interface and, if this occurs, it drastically accelerates the wear.

The 0.030 inch gap is selected to minimize the aesthetic appearance of the concealed bearing hinge and coincidently is the vertical wear limit set forth in the ANSI specifications, the established trade standard of performance. The table below shows that, with the use of the inventive hinges, this standard has been far surpassed.

While continuing external lubrication of the inventive hinges is not required, the fact is that routine building maintenance sometimes results in oiling of hinges. If this occurred, the consequences should not be harmful. Moreover, there have been recommendations to break in certain plastics with an oil film to provide them superior bearing characteristics. Hence a number of hinge tests were conducted with a very thin film of industrial grade light weight oil refined from petroleum, for example Sun R & O 300 oil (rust and oxidation inhibited) applied with a pad to the thrust bearing surface of one of the mating bushings to determine the effect it would have on bearing life. The oil functioned only as a break-in oil since it was not replenished. After any use of the hinge the presence of the oil was not discernible. In a few instances, for example DAF in the one knuckle leaf and Textolite 2001 in the two knuckle leaf, the thrust bearing exhibited slightly more wear using break-in oil. In other instances, the thrust bearings exhibited slightly less wear when the break-in film of oil was initially applied, see Examples 10 and 11. In yet other instances, the use of the break-in oil film resulted in little change in the wear characteristics of the bearings. The tests conducted without an initial film of oil have been asterisked in the following chart.

The flanged plastic bushings used in the Examples shown in the chart had the following dimensions:

| | |
|---|---|
| Diameter of flanged face of bushings | .457″ |
| Diameter of hole through bushings | .222″ |
| Diameter of bushing bodies | .308″ |
| Length of bushings - one knuckle leaf | .750″ |
| Length of bushings - two knuckle leaf | .460″ |

The stainless steel hinge pin used in the following Examples had a finish of 20 micro-inches maximum.

| EXAMPLE | MATERIALS | | CYCLES | WEAR | |
|---|---|---|---|---|---|
| | 1KL | 2KL | (In Millions) | V | L |
| * 1 | DAF | Lexan | 75.9 | .005 | .017 |
| 2 | DAF | Textolite 2001 | 75.5 | .006 | .022 |
| 3 | DAF | Textolite 1841A | 74.4 | .026 | .014 |
| 4 | DAF | DAF | 62 | .023 | .044 |
| 5 | DAF+.05%C | Lexan | 73.8 | .027 | .017 |
| * 6 | DAF+.05%C | Textolite 2001 | 45.4 | .012 | .007 |
| 7 | DAF+.05%C | Textolite 2001 | 27.7 | .019 | .017 |
| 8 | DAF | Textolite 2008 | 37.8 | .028 | .032 |
| 9 | DAF+9.1%D5-07 | Lexan | 30 | .030 | .024 |
| 10 | Fulton 404 | Lexan | 25 | .015 | .021 |
| * 11 | Fulton 404 | Lexan | 14 | .030 | .014 |
| 12 | DAF | DL-40-40 | 24.8 | .004 | .025 |
| * 13 | DAF | DL-40-40 | 24.5 | .007 | .014 |
| 14 | CAB | DAF | 30.8 | .025 | .039 |
| 15 | DAF+9.1%D5-07 | Lexan 40% Glass | 7 | .030 | .005 |
| 16 | Textolite 2001 | Hercules 1900 | 4.5 | .022 | .006 |
| 17 | Textolite 2001 | Textolite 2001 | 3.9 | .026 | .057 |
| 18 | Textolite 2001 | D500 | 2.6 | .030 | .022 |
| 19 | Lexan | Lexan | 4 | .012 | .004 |
| 20 | Textolite 2001 | DAF | 2.4 | .030 | .016 |
| 21 | DAF+.05%C | Lexan | 2.28 | .004 | .008 |
| 22 | Textolite 2001 | Textolite 1841A | 2.2 | .029 | .056 |
| 23 | Lexan | Textolite 2001 | 1.8 | .026 | .003 |
| 24 | DAF+.05%C | Textolite 2001 | 1.97 | .003 | .005 |
| 25 | DAF | D500 | 1.8 | .010 | .009 |
| 26 | CAB | D500 | 1.6 | .030 | .004 |

The plastic-to-plastic thrust bearing interfaces between bushings of these combinations provide low friction and excellent wear resistant characteristics. This functional superiority, when combined with the significant savings in manufacturing costs occasioned by the greater ease in fabricating plastic bushing hinges, provides a superior hinge.

The very slight wear on the thrust bearing surfaces of the plastic bushings, even after long service, permits closer spacing of the hinge knuckles, a desirable feature both functionally and aesthetically.

Note that the tests conducted to establish the usefulness of the plastics set forth above were conducted over a period of years in order to cycle the test bushings the required number of times. Moreover, it was found that some combinations of plastic materials provided relatively poor wear characteristics and hence were discarded as not being satisfactory. In particular, combinations that did not meet the ANSI standards referred to heretofore were considered unsatisfactory.

Another advantage flowing from the use of the hinges of this invention is that if the door weight is unequally shared by the hinges when the door is hung, the bushings in the hinge carrying more of the load will very gradually wear until the load tends to become more evenly distributed among all the hinges, thus maximizing life of the hinges. Of importance is the fact that the bearing characteristics of the hinge bushings initially carrying most of the load will not be adversely affected by the wear required to shift the load equally to all hinges.

Good results may also be obtained with the use of other combinations of plastics within the claimed categories, and other modifications and variations in the disclosed hinge can be made as well. For example, the bushings of the inventive hinge are fully adapted for use in the so-called half mortise, full surface and half surface type hinges. Accordingly, the form of the invention described herein should be considered as illustrative and the invention may be embodied in other forms while remaining within the spirit and scope of the following claims.

I claim:

1. A long life hinge, comprising;
   two hinge leaves, first and second axially aligned and closely spaced hinge knuckles, at least one knuckle formed on each leaf along the adjacent edges thereof;
   recesses formed in adjacent ends of said first and second knuckles.
   a first plastic bushing received in and radially supported by the first knuckle recess and having a smooth end face exposed at the end of said first knuckle;
   a second plastic bushing received in and radially supported by the second knuckle recess and having a smooth end face exposed at the end of said second knuckle;
   a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;
   said first bushing being essentially formed of an acetal resin with at least 5 percent by weight of dispersed discrete particles of a low friction material having the property of transferring in a self-renewing film to a surface against which it rubs; and
   said second bushing being essentially formed of a material selected from the group consisting of an aromatic polycarbonate derived primarily from bisphenol A, a thermosetting phenolic resin and an acetal resin.

2. The hinge defined in claim 1, wherein the material of the second bushing is an aromatic polycarbonate resin derived primarily from bisphenol A.

3. The hinge defined in claim 2, wherein the low friction material is selected from the group consisting of polytetrafluoroethylene and fluorinated ethylene propylene.

4. The hinge defined in claim 2, wherein the polycarbonate has at least 5 percent by weight of TFE dispersed therein.

5. The hinge defined in claim 4, wherein the low friction material is selected from the group consisting of polytetrafluoroethylene and fluorinated ethylene propylene.

6. The hinge defined in claim 2, wherein the polycarbonate is reinforced with glass fibers.

7. The hinge defined in claim 6, wherein the low friction material is selected from the group consisting of polytetrafluoroethylene and fluorinated ethylene propylene.

8. The hinge defined in claim 1, wherein the low friction material is selected from the group consisting of polytetrafluoroethylene and fluorinated ethylene propylene.

9. The hinge defined in claim 1, wherein the material of the second bushing is a thermosetting phenolic resin.

10. The hinge defined in claim 9, wherein the low friction material is selected from the group consisting of polytetrafluoroethylene and fluorinated ethylene propylene.

11. The hinge defined in claim 1, wherein the material of the second bushing is a thermosetting phenolic resin reinforced with a material selected from the group consisting of cloth and paper.

12. The hinge defined in claim 11, wherein the low friction material is selected from the group consisting of polytetrafluoroethylene and fluorinated ethylene propylene.

13. The hinge defined in claim 1, wherein the material of the second bushing is a phenolic resin with graphite content.

14. The hinge defined in claim 13, wherein the low friction material is selected from the group consisting of polytetrafluoroethylene and fluorinated ethylene propylene.

15. The hinge defined in claim 1, wherein the material of the second bushing in the other knuckle is an acetal resin.

16. The hinge defined in claim 15, wherein the low friction material is selected from the group consisting of polytetrafluoroethylene and fluorinated ethylene propylene.

17. The hinge defined in claim 15, wherein the acetal resin has at least 5 percent by weight of TFE dispersed therein.

18. The hinge defined in claim 17, wherein the low friction material is selected from the group consisting of polytetrafluoroethylene and fluorinated ethylene propylene.

19. A long life hinge, comprising:
   two hinge leaves, first and second axially aligned and closely spaced hinge knuckles, at least one knuckle formed on each leaf along the adjacent edges thereof;
   recesses formed in adjacent ends of said first and second knuckles;
   a first plastic bushing received in and radially supported by the first knuckle recess and having a smooth end face exposed at the end of said first knuckle;
   a second plastic bushing received in and radially supported by the second knuckle recess and having a smooth end face exposed at the end of said second knuckle;
   a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;

said first bushing being essentially formed of cellulose acetate butyrate; and said second bushing being formed of an acetal resin.

20. The hinge defined in claim 19, wherein said second bushing is formed of an acetal resin having at least 5% by weight of dispersed discrete particles of a low friction material having the property of transferring in a self-renewing film to a surface against which it rubs.

21. The hinge defined in claim 20, wherein said low friction material is selected from the group consisting of polytetrafluoroethylene and fluorinated ethylene propylene.

22. A long life hinge, comprising:
two hinge leaves, first and second axially aligned and closely spaced hinge knuckles, at least one knuckle formed on each leaf along the adjacent edges thereof;
recesses formed in adjacent ends of said first and second knuckles;
a first plastic bushing received in and radially supported by the first knuckle recess and having a smooth end face exposed at the end of said first knuckle;
a second plastic bushing received in and radially supported by the second knuckle recess and having a smooth end face exposed at the end of said second knuckle;
a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;
said first bushing being essentially formed of a thermosetting phenolic resin with a graphite content; and
said second bushing being essentially formed of a material selected from the group consisting of a thermosetting phenolic resin, a high density polyethylene and an acetal resin.

23. The hinge defined in claim 22, wherein the material of the second bushing is a thermosetting phenolic resin.

24. The hinge defined in claim 23, wherein the phenolic resin has a graphite content.

25. The hinge defined in claim 22, wherein the material of the second bushing is an acetal resin with at least 5 percent by weight of TFE dispersed therein.

26. The hinge defined in claim 22, wherein the material of the second bushing is a high density polyethylene.

27. A long life hinge, comprising:
two hinge leaves, first and second axially aligned and closely spaced hinge knuckles, at least one knuckle formed on each leaf along the adjacent edges thereof;
recesses formed in adjacent ends of said first and second knuckles;
a first plastic bushing received in and radially supported by the first knuckle recess and having a smooth end face exposed at the end of said first knuckle;
a second plastic bushing received in and radially supported by the second knuckle recess and having a smooth end face exposed at the end of said second knuckle;
a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;
said first bushing being essentially formed of an aromatic polycarbonate derived primarily from bisphenol A; and
said second bushing being essentially formed of a material selected from the group consisting of an aromatic polycarbonate derived primarily from bisphenol A and a thermosetting phenolic resin.

28. The hinge defined in claim 27, wherein the material of the second bushing is an aromatic polycarbonate derived primarily from bisphenol A.

29. The hinge defined in claim 27, wherein the material of the second bushing is a thermosetting phenolic resin.

30. The hinge defined in claim 29, wherein the phenolic resin has a graphite content.

31. A long life hinge, comprising:
two hinge leaves, first and second axially aligned and closely spaced hinge knuckles, at least one knuckle formed on each leaf along the adjacent edges thereof;
recesses formed in adjacent ends of said first and second knuckles;
a first plastic bushing received in and radially supported by the first knuckle recess and having a smooth end face exposed at the end of said first knuckle;
a second plastic bushing received in and radially supported by the second knuckle recess and having a smooth end face exposed at the end of said second knuckle;
a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;
said first bushing being essentially formed of an acetal resin with about 20 percent by weight of dispersed discrete particles of polytetrafluoroethylene; and
said second bushing being essentially formed of a material selected from the group consisting of an aromatic polycarbonate derived primarily from bisphenol A, a thermosetting phenolic resin with graphite content and an acetal resin with at least 5 percent by weight of dispersed discrete particles of polytetrafluoroethylene.

32. A long life hinge, comprising:
two hinge leaves, first and second axially aligned and closely spaced hinge knuckles, at least one knuckle formed on each leaf along the adjacent edges thereof;
recesses formed in adjacent ends of said first and second knuckles;

a first plastic bushing received in and radially supported by the first knuckle recess and having a smooth end face exposed at the end of said first knuckle;

a second plastic bushing received in and radially supported by the second knuckle recess and having a smooth end face exposed at the end of said second knuckle;

a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;

said first bushing being essentially formed of an acetal resin with at least 5 percent by weight of dispersed discrete particles of a low friction material having the property of transferring in a self-renewing film to a surface against which it rubs; and said second bushing being essentially formed of a thermosetting phenolic resin having a graphite content.

33. The hinge defined in claim 32, wherein the low friction material is selected from the group consisting of polytetrafluoroethylene and fluorinated ethylene propylene.

34. A long life hinge, comprising:

two hinge leaves, first and second axially aligned and closely spaced hinge knuckles, at least one knuckle formed on each leaf along the adjacent edges thereof;

recesses formed in adjacent ends of said first and second knuckles;

a first plastic bushing received in and radially supported by the first knuckle recess and having a smooth end face exposed at the end of said first knuckle;

a second plastic bushing received in and radially supported by the second knuckle recess and having a smooth end face exposed at the end of said second knuckle;

a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;

said first bushing being essentially formed of an acetal resin with at least 5 percent by weight of dispersed discrete particles of a low friction material having the property of transferring in a self-renewing film to a surface against which it rubs; and said second bushing being essentially formed of an acetal resin with at least 5 percent by weight of dispersed discrete particles of low friction material having the property of transferring in a self-renewing film to a surface against which it rubs.

35. The hinge defined in claim 34, wherein the low friction material is selected from the group consisting of polytetrafluoroethylene and fluorinated ethylene propylene.

36. A long life hinge, comprising:

two hinge leaves, first and second axially aligned and closely spaced hinge knuckles, at least one knuckle formed on each leaf along the adjacent edges thereof;

recesses formed in adjacent ends of said first and second knuckles;

a first plastic bushing received in and radially supported by the first knuckle recess and having a smooth end face exposed at the end of said first knuckle;

a second plastic bushing received in and radially supported by the second knuckle recess and having a smooth end face exposed at the end of said second knuckle;

a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing;

said first bushing being essentially formed of an acetal resin with at least 5 percent by weight of dispersed discrete particles of a low friction material having the property of transferring in a self-renewing film to a surface against which it rubs; and said second bushing being essentially formed of an aromatic polycarbonate derived primarily from bisphenol A with at least 5 percent by weight of said low friction material having the property of transferring in a self-renewing film to a surface against which it rubs.

37. The hinge defined in claim 36, wherein the low friction material is selected from the group consisting of polytetrafluoroethylene and fluorinated ethylene propylene.

38. A long life hinge, comprising:

two hinge leaves, first and second axially aligned and closely spaced hinge knuckles, at least one knuckle formed on each leaf along the adjacent edges thereof;

recesses formed in adjacent ends of said first and second knuckles;

a first plastic bushing received in and radially supported by the first knuckle recess and having a smooth end face exposed at the end of said first knuckle;

a second plastic bushing received in and radially supported by the second knuckle recess and having a smooth end face exposed at the end of said second knuckle;

a hinge pin extending through and radially borne by said bushings to connect said knuckles in end to end relationship with the end faces of said bushings in sliding engagement, at least one of the bushings protruding slightly from said knuckle recess to provide closely spaced hinge knuckles that substantially conceal the bushings from view, said hinge pin rotating relative to the first bushing and being stationary with respect to the second bushing; and said first and second bushings formed of plastic materials that interact at their end faces and with said hinge pin to provide vertical and lateral wear characteristics for the hinge equal to or exceeding the ANSI standards for Grade 2 hinges.

39. A long life hinge, comprising:

first and second hinge leaves;
first and second axially aligned and closely spaced hinge knuckles affixed respectively to respective adjacent edges of said first and second hinge leaves;
an annular recess in at least one of the adjacent ends of said first and second knuckles;
first and second plastic bushings, one end of said first bushing having formed thereon an annular flange with a smooth axially facing surface, and one end of said second bushing also having a smooth axially facing surface, one of said plastic bushings being essentially formed of an acetal resin with at least 5 percent by weight of dispersed discrete particles of a low friction material having the property of transferring in a self-renewing film to a surface against which it rubs, and the other of said plastic bushings being essentially formed of a material selected from the group consisting of an aromatic polycarbonate derived primarily from bisphenol A, a thermosetting phenolic resin and an acetal resin;
said first bushing received in and radially supported by said first knuckle with said flange lying in said recess and at least one of said bushings slightly protruding axially therefrom, said second bushing axially engaging said second knuckle, and said axially facing surfaces of said bushings engaged in abutting relationship for providing thrust bearing between adjacent knuckles; and
a hinge pin received in said bushings and said knuckles and radially borne thereby, said hinge pin rotating relative to said first bushing.

40. A long life hinge, comprising:
first and second hinge leaves;
first and second axially aligned and closely spaced hinge knuckles affixed respectively to respective adjacent edges of said first and second hinge leaves;
an annular recess in at least one of the adjacent ends of said first and second knuckles;
first and second plastic bushings, one end of said first bushing having formed thereon an annular flange with a smooth axially facing surface, and one end of said second bushing also having a smooth axially facing surface;
said first bushing received in and radially supported by said first knuckle with said flange lying in said recess and at least one of said bushings slightly protruding axially therefrom, said second bushing axially engaging said second knuckle, and said axially facing surfaces of said bushings engaged in abutting relationship for providing thrust bearing between adjacent knuckles;
a hinge pin received in said bushings and said knuckles and radially borne thereby, said hinge pin rotating relative to said first bushing; and
said first and second bushings formed of plastic materials that interact at their axially facing surfaces and with said hinge pin to provide vertical and lateral wear characteristics for the hinge equal to or exceeding the ANSI standards for Grade 2 hinges.

41. A long life hinge, comprising:
a pair of adjacent hinge leaves;
first and second axially aligned and closely spaced hinge knuckles, at least one knuckle formed on each leaf along the adjacent edges thereof;
a first plastic bushing extending axially into said first knuckle and slightly protruding axially therefrom and having a smooth axially facing surface;
a second plastic bushing embedded in and radially supported by one of said first and said second knuckles and having a smooth axially facing surface;
a hinge pin received in and radially borne by at least one of said bushings and said knuckles to secure said knuckles in axial alignment with said smooth axially facing surfaces of said bushings in face-to-face abutting relationship to provide a thrust bearing, said hinge pin rotating relative to one of said bushings and rotating with the other of said bushings;
the bushing which rotates relative to the said pin being formed essentially of an acetal resin with dispersed discrete particles of low friction material having the property of transferring in a self-renewing film to a surface against which it rubs;
the other bushing being formed essentially of a material selected from the group consisting of an aromatic polycarbonate derived primarily from bisphenol A, a thermosetting phenolic resin and an acetal resin.

42. A long life hinge, comprising:
a pair of adjacent hinge leaves;
first and second axially aligned and closely spaced hinge knuckles, at least one knuckle formed on each leaf along the adjacent edges thereof;
a first plastic bushing extending axially into said first knuckle and slightly protruding axially therefrom and having a smooth axially facing surface;
a second plastic bushing embedded in and radially supported by one of said first and said second knuckles and having a smooth axially facing surface;
a hinge pin received in and radially borne by at least one of said bushings and said knuckles to secure said knuckles in axial alignment with said smooth axially facing surfaces of said bushings in face-to-face abutting relationship to provide a thrust bearing, said hinge pin rotating relative to one of said bushings and rotating with the other of said bushings; and
said first and second bushings formed of plastic materials that interact at their axially facing surfaces and with said hinge pin to provide vertical and lateral wear characteristics for the hinge equal to or exceeding the ANSI standards for Grade 2 hinges.

43. A long life hinge, comprising:
a hinge pin;
first and second plastic bushings concentrically disposed on said hinge pin in axial juxtaposition, one of said plastic bushings rotating, in use, relative to said pin and being essentially formed of an acetal resin with at least 5 percent by weight of dispersed discrete particles of a low friction material having the property of transferring in a self-renewing film to a surface against which it rubs, and the other of said plastic bushings remaining angularly stationary, in use, relative to said pin and being essentially formed of a material selected from the group consisting of an aromatic polycarbonate derived primarily from bisphenol A, a thermosetting phenolic resin, and an acetal resin;

each of said bushings having a flat, axially facing surface, said surfaces lying in mutually abutting relationship to provide a thrust bearing;

a first hinge knuckle surrounding and supporting said first bushing against radial and thrust compressive loading, and a second hinge knuckle, axially spaced in close juxtaposition to said first knuckle and contacting said second bushing in axial thrust transmission engagement therewith, with said second bushing axially protruding slightly into the space between said knuckles to maintain a slight axial separation between said knuckles; and a first and a second hinge plate affixed to said first and second knuckles respectively.

44. A long life hinge, comprising:

a hinge pin;

first and second plastic bushings concentrically disposed on said hinge pin in axial juxtaposition, one of said plastic bushings rotating, in use, relative to said pin, and the other of said plastic bushings remaining angularly stationary, in use, relative to said pin;

each of said bushings having a flat, axially facing surface, said surfaces lying in mutually abutting relationship to provide a thrust bearing;

a first hinge knuckle surrounding and supporting said first bushing against radial and thrust compressive loading, and a second hinge knuckle, axially spaced in close juxtaposition to said first knuckle and contacting said second bushing in axial thrust transmission engagement therewith, with said second bushing axially protruding slightly into the space between said knuckles to maintain a slight axial separation between said knuckles;

a first and a second hinge plate affixed to said first and second knuckles respectively; and said first and second bushings formed of plastic materials that interact at their axially facing surfaces and with said hinge pin to provide vertical and lateral wear characteristics for the hinge equal to or exceeding the ANSI standards for Grade 2 hinges.

* * * * *

UNITED STATES PATENT AND TRADEMARK OFFICE
CERTIFICATE OF CORRECTION

PATENT NO. : 3,921,225
DATED : Nov. 25, 1975
INVENTOR(S) : Charles R. Suska

It is certified that error appears in the above–identified patent and that said Letters Patent are hereby corrected as shown below:

<u>Col. 3</u>, <u>line 49</u>, "flanges of" should read --flanges by--;

<u>Col. 4</u>, <u>line 21</u>, "of" should read --or--;

<u>Col. 5</u>, <u>line 33</u>, "materiala" should read --material--;

<u>Col. 6</u>, <u>line 55</u>, "ASsuming" should read --Assuming--;

<u>Col. 7</u>, <u>line 58</u>, "applied," should be --applied;-- and

<u>Col. 8</u>, <u>Example 15</u>, "Glass" should appear directly beneath "Lexan 40%".

Signed and Sealed this twenty-fourth Day of February 1976

[SEAL]

Attest:

RUTH C. MASON
*Attesting Officer*

C. MARSHALL DANN
*Commissioner of Patents and Trademarks*